United States Patent [19]

Iwamoto et al.

[11] Patent Number: 4,812,916
[45] Date of Patent: Mar. 14, 1989

[54] VISUAL MONITORING DEVICE WHICH PROJECTS AN IMAGE OF A REGISTER MARK ONTO A SCANNING SURFACE FOR USE IN SETTING IMAGE PROCESSING CONDITIONS

[75] Inventors: Hiroshi Iwamoto; Yutaka Tamura; Yuji Mizuno; Akihiro Yokota, all of Kyoto, Japan

[73] Assignee: Dainippon Screen Mfg. Co., Ltd., Kyoto, Japan

[21] Appl. No.: 30,997

[22] Filed: Mar. 27, 1987

[30] Foreign Application Priority Data

Mar. 31, 1986 [JP] Japan .................................. 61-74613

[51] Int. Cl.4 .......................... H04N 1/06; H04N 1/028
[52] U.S. Cl. .................................... 358/289; 358/285; 358/292; 358/294
[58] Field of Search ............... 358/285, 287, 289, 290, 358/291, 292, 293, 294

[56] References Cited

U.S. PATENT DOCUMENTS

| 4,535,365 | 8/1985 | Sakamoto | 358/287 |
| 4,673,989 | 6/1987 | Yamada et al. | 358/289 |
| 4,742,401 | 5/1988 | Andree et al. | 358/292 |

FOREIGN PATENT DOCUMENTS

| 222146 | 5/1985 | Fed. Rep. of Germany | 358/289 |
| 57-24943 | 2/1982 | Japan | 358/285 |
| 57-56843 | 4/1982 | Japan | 358/285 |
| 58-162168 | 9/1983 | Japan | 358/75 |
| 59-14958 | 8/1984 | Japan | 358/75 |
| 61-223745 | 10/1984 | Japan | . |
| 60-62778 | 4/1985 | Japan | 358/289 |
| 60-78448 | 5/1985 | Japan | 358/289 |

*Primary Examiner*—James J. Groody
*Assistant Examiner*—Randall S. Svihla
*Attorney, Agent, or Firm*—Lowe, Price, LeBlanc, Becker & Shur

[57] ABSTRACT

Image processing conditions for scanning and processing an original by an electronic process scanner are set by an external image processing condition setting apparatus wherein a first system of coordinates is prepared in the scanner for processing, and a second system of coordinates is prepared in the image processing condition setting apparatus for position setting. An original cylinder is commonly used by both the scanner and apparatus, and by using a marked line formed on the surface of the cylinder as a reference position, both systems of coordinates are matched. A visual monitoring device which projects an image of a register mark onto the surface of the original cylinder is used in setting the image processing conditions. The visual monitoring device magnifies the image of the mark and a peripheral area of the surface of the cylinder, thereby enabling an operator to accurately locate a given position on the cylinder.

3 Claims, 5 Drawing Sheets

VISUAL MONITORING DEVICE WHICH PROJECTS AN IMAGE OF A REGISTER MARK ONTO A SCANNING SURFACE FOR USE IN SETTING IMAGE PROCESSING CONDITIONS

BACKGROUND OF THE INVENTION

1. Field of the Invention

This invention relates to a method for setting image processing conditions for scanning and processing an image, such as scanning start/end positions, calibration position, highlight point and shadow point positions, in an image scanning and processing apparatus such as an electronic process scanner external to said image scanning and processing apparatus. This invention also relates to a visual monitoring device for visually reading positions on the scanning surface related to said setting.

2. Description of the Prior Art

In an electronic process scanner, it generally takes a long time to set the original on the input cylinder and set various image processing conditions, such as color correction, optimally according to the original (hereinafter, this process is called "setup"). It also takes a considerably long time to actually scan the original following setup so as to obtain a process film in which the original is separated in colors and printed. Therefore, the job efficiency is extremely poor if the setup and actual original scanning process are carried out in series. Conventionally, two scanning input unit sets were provided, for example, and they were alternately connected to a common output unit (film printing and processing unit), so as to carry out the setup of the next original in the other scannng input unit. In this parallel processing system, however, although the productivity was improved, it was very uneconomical because it needed two expensive and complicated input unit sets for scanning the original and processing the image. Besides, when it is attempted to realize a simpler setup method without using the electronic scanner itself, in order to set up the various coorditions including the position data perfectly, it is necessary to match perfectly the system of coordinates at the time of setting up and that of actual scanning process. If these systems of coordinates cannot be matched, the coordinates to indicate the points on the original, e.g. printing start point and end point, must be set on the scanner itself. This is a great drawback for the enhancement of operating rate of the scanner and improvement of efficiency of the scanner operator.

Devices for visually reading position on the scanning surface such as shown in FIG. 1 to FIG. 3 are known. FIG. 1 refers to a structure in which a reading device is assembled into the scanning head 1 of a process scanner, and a reflector 3 is inserted, when reading, into the optical axis of the pickup lens 2 (a photoelectric conversion element such as photomultiplier, which is not shown, is located at a remote position). When positioning the scanning head 1 at a desired position of an original 5 adhered on an original cylinder 4, the scanning head 1 and the original cylinder 4 are coarsely moved so that light from a light source (not shown) may come near the desired position, and a very tiny spot on the original 5, magnified by the pickup lens 2, is focused on a ground glass 6 through the reflector 3. A register mark used as a positioning target is printed on the ground glass 6, and the operator can fine-adjust the positioning while observing the image on the ground glass 6 magnified through the lens 7. In this method, however, the diameter of the spot, being related with the spot of the pickup of the scanner, is as small as 0.7 mm; the magnification factor is very high, and it is in practice not known in which position of the original 5 the image on the ground glass 6 is located. Thus, this structure is not suited to positioning because it is originally composed for use in focusing. The scanning head accordingly is positioned approximately by the operator directly observing the illuminated part of the original 5 by the light spot from the light source (not shown).

The conventional devices shown in FIGS. 2(a) and 2(b) are convenient for visually reading the end position directly by bringing a needle-shaped pointer 8 close to the original 5. However, reading errors may occur due to the position of the eye unless the original 5 and the pointer 8 are extremely close to each other. However, when the pointer 8 is too close, the expensive original 5 may be damaged.

In the conventional device shown in FIG. 3, there are two target plates 9a and 9b in which markers are drawn and a lens 10 is arranged into line. When the markers on the target plates 9a and 9b overlap, the markers, magnified by the lens 10, are read visually by the operator. In the device, however, since it is required to aim at a position on the original 5 by matching the two markers, the eye position is limited and the device accordingly is difficult to use. Also, use of the device tires the operator because the eye focusing position differs between the target plates 9a and 9b and the original 5 under magnification by the lens 10.

SUMMARY OF THE INVENTION

The present invention is directed to a method for setting image processing conditions when scanning and processing an original by using an image scanning and processing apparatus external to said apparatus. The invention is further directed to a visual montoring device for enabling an operator to visually read positions on the scanning surface related to the setting when initially setting image processing conditions.

The image processing condition setting method of the invention comprises the steps of preparing a first system of coordinates for processing in the image scanning and processing apparatus, preparing a second system of coordinates for setting the position when setting said image processing conditions, setting various image processing conditions including the position setting while matching said first system of coordinates and second system of coordinates by using a command reference position, and applying image processing condition data including coordinate position data directly to the image scanning and processing apparatus.

The visual monitoring device of the invention comprises means for projecting light including information of a register mark on a scanning surface to form an image of the mark on the scanning surface, and means for magnifying the image of the register mark and its peripheral scanning surface, so that the position on the scanning surface may be visually read by an operator observing the magnified image.

Accordingly, it is a primary object of this invention to present an image processing conditions setting method capable of setting up comprehensive image processing condition data including coordinate position data, external to the image processing apparatus.

It is another object of this invention to present a visual montoring device capable of enabling an operator to easily and precisely accurately visually position a scanning head, and which is simple in construction and free from risk of damaging the original.

These and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
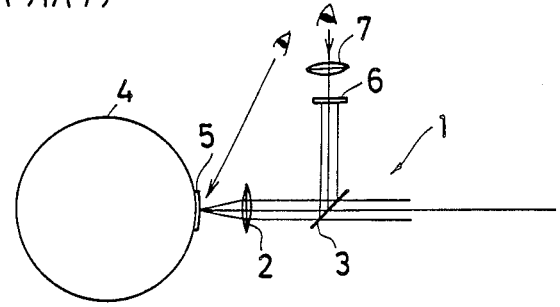
FIGS. 1 2(a), 2(b), and 3 are explanatory diagrams showing conventional devices for visually reading positions on a scanning surface.
Figure 2A:
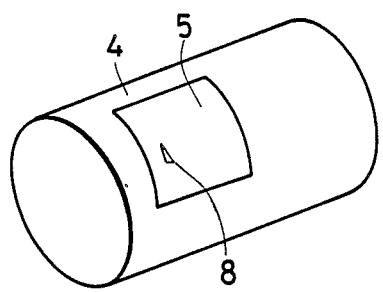
Figure 2B:
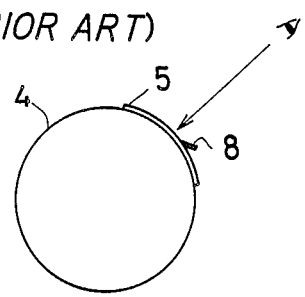
Figure 3:
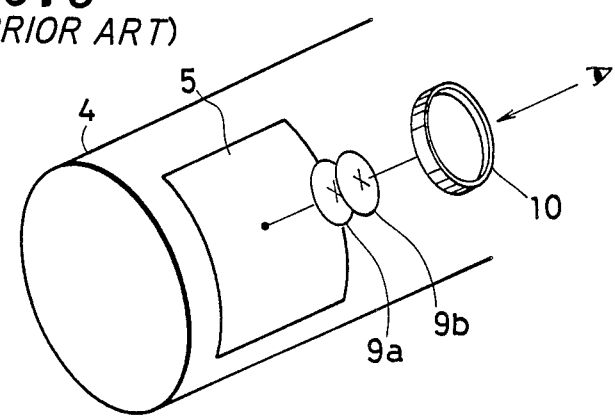
Figure 4:
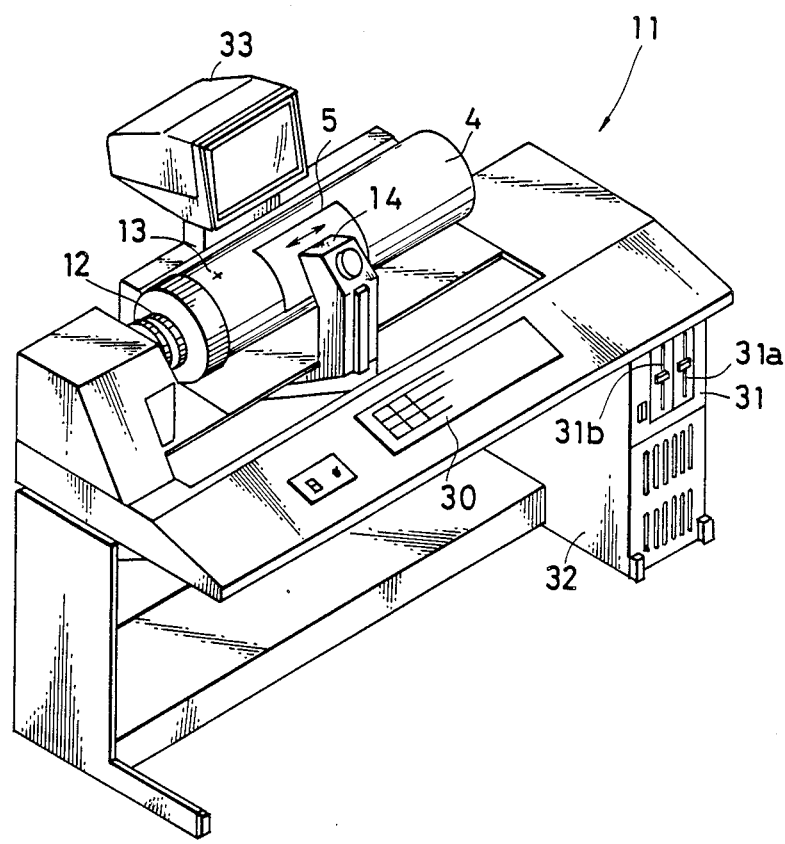
FIG. 4 is a perspective view showing an example of apparatus construction embodying the image processing condition setting method according to the invention.

FIG. 4 is a perspective view showing an example of an apparatus to carry out an image processing condition setting method according to this invention. An original cylinder 4 for mounting an original 5 is detachable from the main body 11 of the apparatus, and it is attached or detached by way of a mounting chuck 12 fitted to the main body 11. On the base surface of the original cylinder 4, a point (crossed lines) 13 is set to show the origin of a system of coordinates on the cylinder 4. To the rotary shaft of chuck 12 (i.e., the rotary shaft of original cylinder 4), a rotary encoder (not shown) is linked to measure the phase of rotation of the original cylinder 4 (i.e., the coordinate position in the Y-axis direction in FIG. 5).

Figure 6:
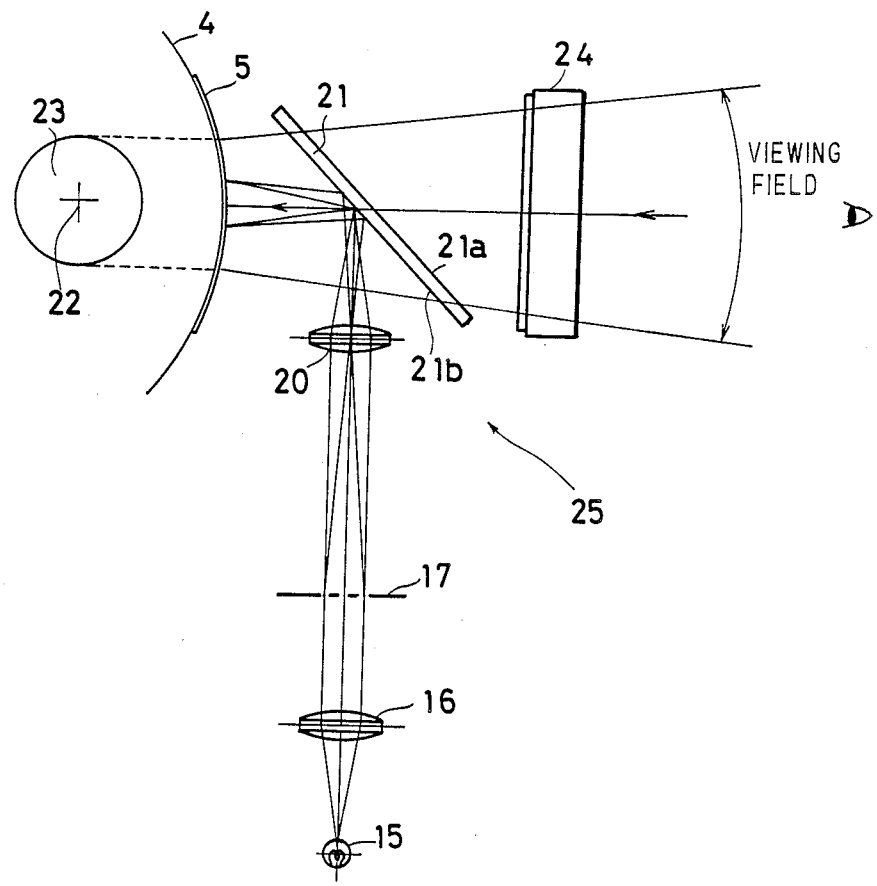
FIG. 6 is an optical path diagram showing an example of a visual monitoring device of the invention.

Opposite the surface of the original cylinder 4, a viewer 14 for reading the coordinate position is provided slidably in the axial direction of the cylinder 4, so that an arbitrary coordinate position on the original cylinder 4 can be read by the rotation of the original cylinder 4 (moving the Y-axis direction) and sliding of the viewer 14 (moving in the X-axis direction). FIG. 6 is an optical path diagram showing a preferred example of applying as the viewer 14 the visual monitoring device 25 of this invention. In this embodiment, in order to eliminate parallax, the target is directly projected on the original surface.

Figure 7:
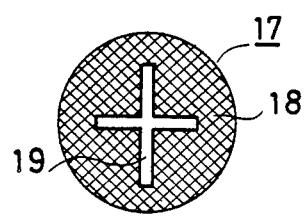
FIG. 7 is a diagram showing an example of a target.

The light emitted from a light source 15 composed of a halogen lamp, for example, is converged by a condenser lens 16 to become approximately parallel light, and is projected on a target 17 on which a register mark is formed as an optical indicator. The target 17 may, for example, be a cross slit having a white cross marker 19 on a black film 18, as shown in FIG. 7, and in this case the light passing through the target 17 becomes a cross of light. In this way, the light containing the information of the mark is formed.

The light containing the information of the mark is projected, through a projector lens 20, on a desired position on the surface of the original cylinder 4 as a scanning surface, for example, on the surface of the original 5 attached to the original cylinder 4. To separate the light projecting side from the operator's visual reading side, a half-mirror 21 is disposed in the middle between the original cylinder 4 and projector lens 20 at an angle of 45° with respect to the optical axis of the projector lens 20 so as to fold the optical axis at a right angle, thereby directing the light to be perpendicular to the surface of the original cylinder 4. It is noted that instead of folding the optical axis at the projection side, the optical axis at the reading side may be folded. As the half-mirror 21, for example, a mirror having an aluminum deposition on the face 21b and an antireflection coating applied on the back 21a may be used. Thus, the image of the register mark is formed directly on the original 5. For example, when the target 17 shown in FIG. 7 is used, the cross of light 22 can be formed on the original 5.

Figure 8:
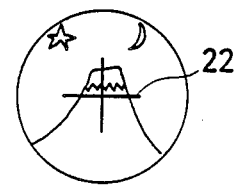
FIG. 8 is a diagram showing an example of an image seen through a closeup lens.

The register mark image 22 thus formed is magnified, together with the peripheral scanning surface 23 (in this case, part of the original 5), by a closeup lens 24, and the mark is observed visually by the operator from the perpendicular direction. FIG. 8 is an example of the image seen by the operator through the closeup lens 24, in which the register mark image (the cross of light) 22 projected directly on the surface of the original 5 is visible in the center of the viewing field. The viewing field may be selected to be about, for example, 30 mm on the surface of the original 5. The operator moves the visual monitoring device 25 and the original cylinder 4 so that the register mark image 22 may come to a desired position on the original 5, and the visual monitoring device 25 itself, or the viewer 14 in which the visual monitoring device 25 is incorporated, or other mechanism such as scanning head (not shown), may be positioned at a desired position.

Since the optical axis of the register mark is perpendicular onto the surface of the original cylinder 4, if the diameter of the original cylinder 4 varies, the mark can be projected perpendicular to the original 5 by moving the visual monitoring device back and forth on the optical axis so that the rotating direction of the cylinder and the position of subscanning direction are not changed and correct position information can be obtained. Furthermore, since the register mark image 22 is projected directly on the original 5, there is no error due to the eye position at the time of reading, that is, there is no parallax. The reading precision is improved and the posture of the operator at the time of reading is very relaxed. Moreover, a wide region on the original 5, magnified through the closeup lens 24, is seen by the operator so that the region is very easy to see and it is possible to locate the position on the original 5 at a glance. Therefore, fine positioning can be carried out by the operator easily. In addition, since this apparatus can be disposed at a sufficient distance from the original cylinder 4, the expensive original 5 will not be damaged, and the structure is also very simple as stated above.

Figure 5:
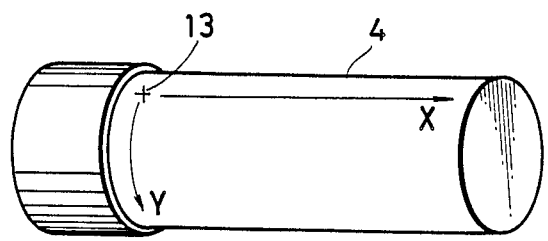
FIG. 5 is an explanatory diagram of an original cylinder.
Figure 9:
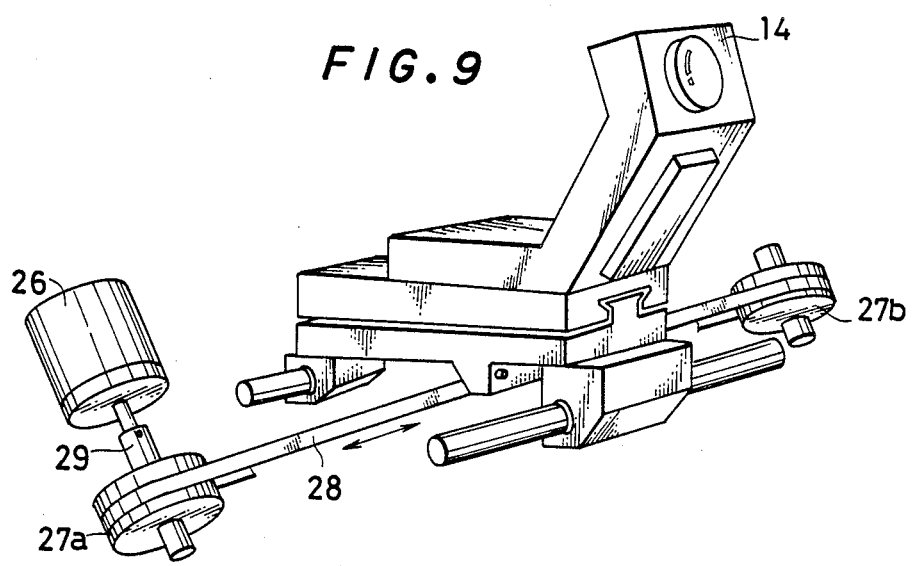
FIG. 9 is an explanatory diagram showing an encoder driving system in accordance with the invention.

To known the slide position, that is, the coordinates position in the X-axis direction in FIG. 5, of the viewer 14 a linear encoder, for example, though expensive, may be installed in the moving path of the viewer 14, so that the X-axis coordinate position can be detected with a high precision. On the other hand, in this embodiment, from an economical point of view, a less expensive X-axis coordinate position detecting system is composed while maintaining a high precision, and FIG. 9 is a diagram showing an example of the construction of such a detecting system. In the shown example, an inexpensive rotary encoder 26 is used as the position detector. To drive the rotary encoder 26 by converting the linear motion of the viewer 14 in the X-axis direction into a rotary motion, provided is an encoder driving system composed of a pair of pulleys 27a and 27b and a steel belt 28 stretched between them so as not to cause slipping. That is, the viewer 14 is linked to one point of the steel belt 28, and the rotation of the pulley 27a accompanying the movement of the viewer 14 in the X-axis direction indicated by the arrow in the drawing is transmitted to the rotary encoder 26 through the pulley shaft 29. At this time, since the steel belt 28 is stretched taut and the load is very small, due to the rotary encoder 26 only, slipping does not occur at all between the steel belt 28 and the pulleys 27a and 27b. Accordingly, by strictly defining the pulley diameter by cutting and polishing, he absolute dimension does not vary and no correction when converting the rotary motion into a linear motion is required, so that a high precision X-axis coordinate position detection may be realized.

If, for example, a rubber belt is used instead of the steel belt 28, position detection with high precision is impossible due to effects of uneven thickness and elongation or contraction. If timing belt and a timing pulley are used, backlash occurs at the engaging portion of the belt and pulley, and precision in movement in two directions is reduced. Further, the pulley diameter cannot be finely adjusted by cutting or grinding and, therefore, it is difficult to achieve an absolute dimension when converting the linear motion into rotary motion. When the same feed screw as used generally in a process scanner is used herein, a motor to turn the screw is needed and the structure becomes complicated. Also, backlash of the screw occurs, which means that precision in movement in two directions is inferior as in the case of use of a timing belt and a timing pulley as stated above.

Returning to FIG. 4, the setup apparatus 11 comprises, aside from the components mentioned above, a keyboard 30 allowing the operator to feed necessary data, a floppy disk driver 31 for driving the floppy disk data as an external memory unit, an electrical box 32 incorporating a control processing device made of, for example, a microcomputer for data processing for setting up and a CRT display 33 allowing the operator to set up in the interactive system.

Figure 10:
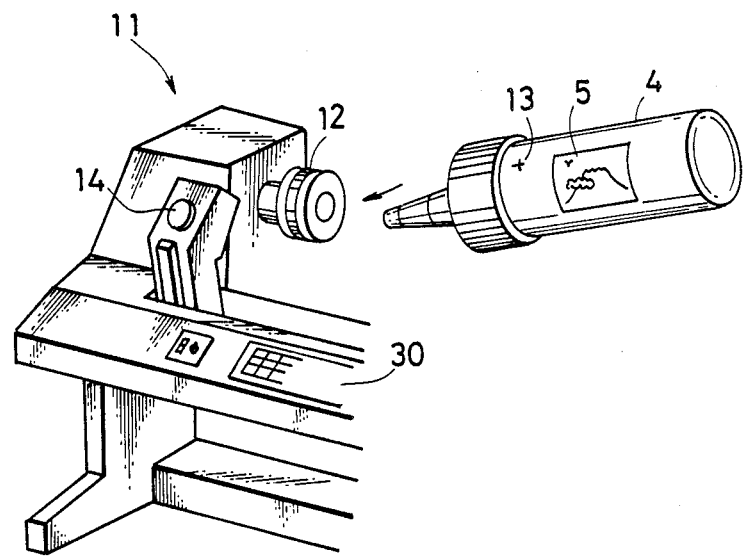
FIG. 10 is a diagram showing the mounting position of the original cylinder.

The setup procedure using the apparatus shown in FIG. 4 is now described. First, as a data input preparatory job, as shown in FIG. 10, the viewer 14 is shifted to the left end to allow easy mounting and dismounting of the original cylinder 4. In succession, the original cylinder 4 on which the original 5 has been mounted is fitted to the cylinder mounting chuck 12 of the apparatus 11, as indicated by the arrow in the drawing. Meanwhile, to mount the original 5 on the original cylinder 4, since a strong force is required to enhance the contact integrity, although not effected on this apparatus, an original winding device (not shown) or the like is used. When a floppy disk is inserted into the floppy disk driver 31, the data input preparatory job is complete. As the floppy disk, a system disk and a data disk are used, and the system disk is for various controls and displays in which a prepared setup program is stored, while the data disk is for data communications with the process scanner in which various types of setup information will be fed in the next process. The system disk is inserted into one inlet 31a of the floppy disk driver 31, and the data disk is inserted into the other inlet 31b.

After the data input preparatory job is complete, the setup data is supplied. When the system disk is inserted into the floppy disk 31, the control processing device built in the electrical box 32 fetches the setup program stored in the system disk, and thereafter while presenting specified displays on the CRT 33 according to the program, the data input job proceeds in the interactive system with the operator. The operator feeds data by key operation of the keyboard 30.

Figure 11:
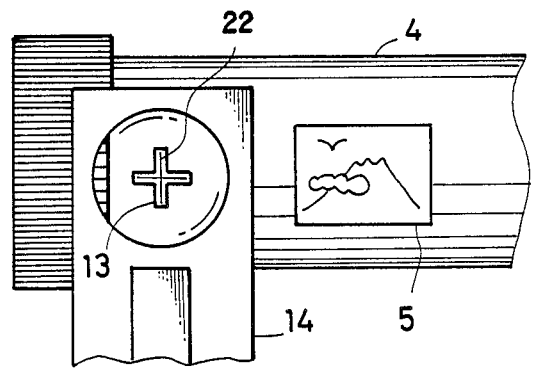
FIG. 11 is an explanatory diagram showing the coordinates origin setting method in accordance with the invention.

The input sequence conforms to the programmed algorithm, which is, for example, as follows. The printing side roll film remainder, cylinder size, transparency or reflection original specification and other status data are sequentially fed. Then the origin of coordinates is set as follows. The viewer 14 is moved by hand to the effective portion of the cylinder, and is moved back and forth according to the diameter of the original cylinder 4. While the operator manually rotates the original cylinder 4, the viewer 14 is caused to slide up to a specified position on the cylinder 4, and the cross mark 32 for target in the viewing field of the viewer 14 is matched with the marked line 13 indicating the origin on the base surface of the original cylinder 4, as shown in FIG. 11. As the operator depresses specified keys on the keyboard 30 in this state, the position of the origin of the system of coordinates for setting various positions at the time of setting up is determined and set. At this time, the position signals are obtained from the rotary encoder (not shown) mounted on the rotary shaft of the original cylinder 4 (the position in the Y-axis direction) and the rotary encoder 26 in FIG. 9 (the position in the X-axis direction). Next, position data for designating various positions such as calibration position and printing start and end positions will be input by the operator using the viewer 14 as in the case of setting the position of the origin. Finally, color correction data corresponding to the original and other data are fed. This data input may be made every time, or by a menu system by preparing a menu corresponding to the original pattern. Thus, supplied setup data is stored in the data disk which is inserted in the floppy disk driver 31.

When the setup job is completed in this way, the setup data is transferred to the process scanner through the data disk. This job is as follows. First, the original cylinder 4 and the data disk are dismounted from the setup apparatus 11, and are put on the process scanner (not shown). Then, the data setting program of the scanner is started up, and the position of the origin of the system of coordinates for image scanning and processing in the scanner is set by, for example, the same interactive system as explained above, using the CRT diaplay provided in the scanner. For this setting, the viewer furnished to the scanning head of the scanner is used, and exactly as in the case of setting the origin position in the above setup apparatus, the matching position of the viewer's cross mark and the origin indicating mark line 13 of the original cylinder 4 is registered as the origin of the system of coordinates for processing in the scanner. As a result, the system of coordinates of position setting at the time of setting up and that of processing by the scanner are made perfectly coincident with each other, so that various types of setup data including the position data which have been thus set up can be directly applied into the scanner. When the scanning start switch of the scanner is turned on, the setup data is automatically read into the scanner, and a series of operation from winding of film and color separation to film discharge will be done automatically at the recording unit.

The above embodment relates to a process scanner, but the image processing condition setting method of this invention may be also applied to other image scanning and processing apparatus than the process scanner.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. In an image scanning and processing apparatus, a visual monitoring device for visually observing a portion of a scanning surface of the apparatus for calibrating image processing parameters used for scanning and processing an image, said device comprising:

means for projecting light including an image of a register mark onto a portion of said scanning surface; and means for magnifying said image of the mark and an area peripheral to said image on said scanning surface so that the portion of the scanning surface may be observed by an operator as a magnified image.

2. A visual monitoring device in accordance with claim 1, wherein the light including the image of the the register mark is formed by masking a parallel light beam with a mark slit.

3. A visual monitoring device in accordance with claim 1, wherein said projecting means and said magnifying means are separated by a half-silvered mirror.

* * * * *